F. DREW.
AUTOMOBILE.
APPLICATION FILED DEC. 9, 1912.

1,062,898.

Patented May 27, 1913.

Witnesses:
Alice Ackroyd
Miriam Clement

Inventor:
Fred Drew
by Phillips Van Every & Fish
Attorneys.

UNITED STATES PATENT OFFICE.

FRED DREW, OF BOSTON, MASSACHUSETTS.

AUTOMOBILE.

1,062,898.   Specification of Letters Patent.   Patented May 27, 1913.

Application filed December 9, 1912. Serial No. 735,674.

*To all whom it may concern:*

Be it known that I, FRED DREW, a citizen of the United States, residing at Boston, in the county of Suffolk and State of Massachusetts, have invented certain new and useful Improvements in Automobiles; and I do hereby declare the following to be a full, clear, and exact description of the invention, such as will enable others skilled in the art to which it appertains to make and use the same.

The object of the present invention is to provide means whereby a portion of the space in the body of an automobile ordinarily occupied by the passengers may be converted into a storage receptacle to receive temporarily, and safely retain robes, suit-cases, or other articles when the machine is left unguarded.
With this object in view, the present invention contemplates the provision in an automobile of a cover so constructed that it can be folded or rolled up, or otherwise collapsed so as to occupy a small space in the automobile, and so arranged that when extended it will inclose a portion of the passenger space so as to form a storage receptacle.

The invention contemplates the provision of any suitable form of collapsible cover arranged to inclose any desired portion of the space in an automobile body which is or may be occupied by the passengers while the car is in use. The invention, however, is particularly applicable to automobiles provided with front and rear seats and with side doors, since in this type of automobile the space between the front and rear seats provides for a storage receptacle of large capacity, while the collapsible cover can be stowed away when not in use close to the back of the front seat where it will not take up an objectionable part of the passenger space. Also in this type of automobile the cover when extended can be readily arranged to prevent the opening of the side doors, suitable securing means for the doors being provided which extend into the space inclosed by the cover when extended so that these securing means are rendered inaccessible by the cover.

Figure 1:
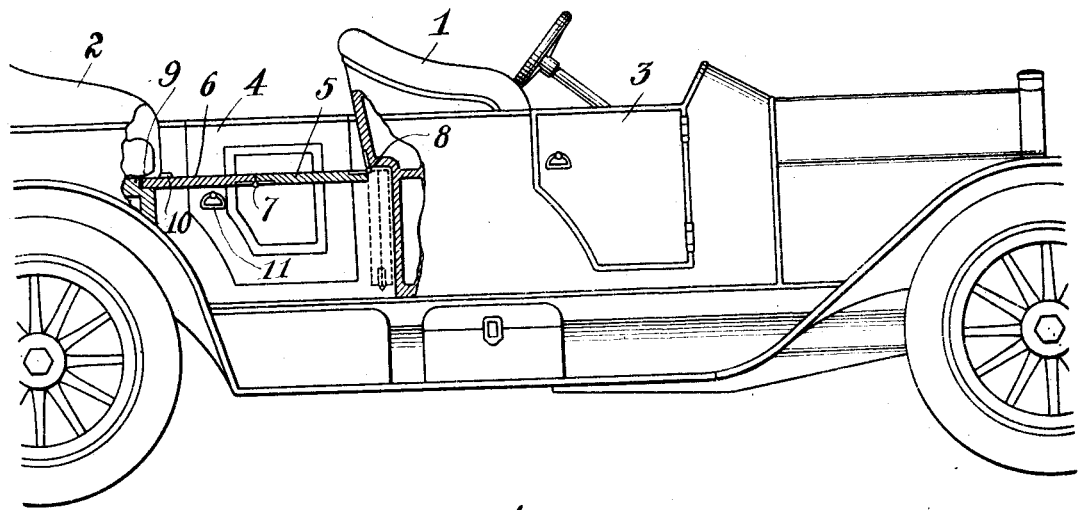
Figure 2:
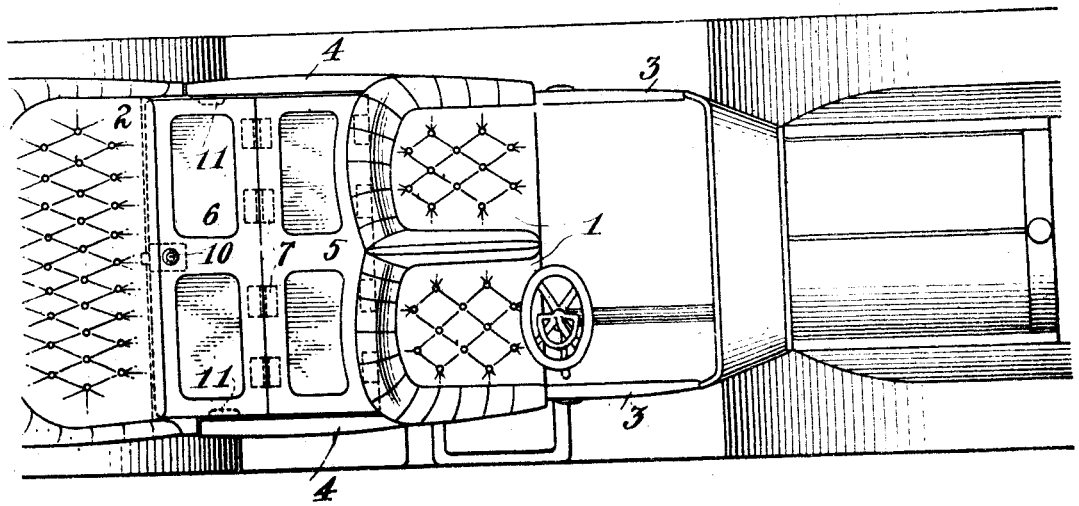

The present invention will be readily understood from an inspection of the accompanying drawing in which; Figure 1 is a view in side elevation partly in section, of an automobile with the preferred form of the present invention applied thereto; and Fig. 2 is a plan view of the automobile illustrated in Fig. 1.

The automobile illustrated in the drawing comprises a body portion provided with front and rear seats 1 and 2, and with fore and rear side doors 3 and 4. To enable a portion of the passenger space between the front and rear seats to be converted into a storage receptacle a collapsible cover is provided consisting of two leaves 5 and 6. These leaves are hinged together at 7 and the leaf 5 is hinged to the rear of the front seat at 8. When the cover is extended as illustrated in full lines in the drawing, the leaf 6 rests upon the front portion of the rear seat 2 and the cover extends horizontally across the space between the front and rear seats. When the cover is collapsed it assumes the position indicated in dotted lines in Fig. 1, in which position it takes up a comparatively small amount of the passenger space. In the construction illustrated the hinges 7 are arranged on the lower side of the cover when extended so that the adjacent edges of the leaves 5 and 6 abut and no additional means are required to support the cover in horizontal position. To receive the free edge of the leaf 6 the front portion of the rear seat is preferably recessed at 9 and in order to secure the cover in extended position the leaf 6 is provided with any suitable form of lock indicated at 10. The leaves 5 and 6 extend completely across the body of the automobile between the side doors 4 and 6 completely inclosing the space beneath the cover.

To prevent access to the storage space through the doors 4, suitable securing means for the doors are provided, accessible only from the interior of the automobile body and these securing means are so located that they are inaccessible when the cover is in extended position. As illustrated in the drawing, the securing means are those ordinarily employed and consist of suitable latches operated by interior handles 11. These handles are so located that they are below the cover when the cover is extended. The cover thus not only serves as a means for inclosing the space between the front and rear seats of the automobile, but also acts indirectly as a means for locking the doors in closed position.

The nature and scope of the present invention having been indicated and a pre ferred form of the invention having been specified as described, what is claimed is:—

1. The combination with the body of an automobile having a passenger space provided with side doors, of a collapsible cover arranged when extended to inclose a portion of the passenger space to form a storage receptacle, means whereby the collapsible cover may be locked in operative position, and securing means for the doors inaccessible when the cover is extended.

2. The combination with the body of an automobile having front and rear seats and side doors, of a collapsible cover secured to the back of the front seat and arranged when extended to inclose the space between the front and rear seats to form a storage space, means whereby the collapsible cover may be locked in operative position, and securing means for the doors inaccessible when the cover is extended.

FRED DREW.

Witnesses:
 FRED O. FISH,
 BURTON W. CARY.

Copies of this patent may be obtained for five cents each, by addressing the "Commissioner of Patents. Washington, D. C."